US008908692B2

(12) United States Patent
Hsue et al.

(10) Patent No.: US 8,908,692 B2
(45) Date of Patent: Dec. 9, 2014

(54) DEVICE FOR REALIZING UPSTREAM AGGREGATION AND DOWNSTREAM TRANSLATION OF A VIRTUAL LOCAL AREA NETWORK AND METHOD THEREOF

(75) Inventors: Hong-June Hsue, Hsinchu (TW); Mu-Jung Hsu, Miaoli County (TW); Hsiu-Chu Lin, Taichung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 28 days.

(21) Appl. No.: 13/612,847

(22) Filed: Sep. 13, 2012

(65) Prior Publication Data
US 2013/0287025 A1 Oct. 31, 2013

(30) Foreign Application Priority Data

Apr. 25, 2012 (TW) ............................. 101114672 A

(51) Int. Cl.
*H04L 12/28* (2006.01)
(52) U.S. Cl.
USPC ............................................. 370/392
(58) Field of Classification Search
CPC ........ H04L 49/039; H04L 29/06; H04L 12/56
USPC ........................................ 370/392
See application file for complete search history.

(56) References Cited

U.S. PATENT DOCUMENTS

| 6,788,681 | B1* | 9/2004 | Hurren et al. ................. 370/389 |
| 7,715,934 | B2* | 5/2010 | Bland et al. .................... 700/94 |
| 8,018,938 | B1* | 9/2011 | Fromm et al. ................ 370/392 |
| 2004/0172480 | A1 | 9/2004 | Hirose |
| 2007/0110078 | A1* | 5/2007 | De Silva et al. ......... 370/395.53 |
| 2011/0141881 | A1 | 6/2011 | Joshi |
| 2012/0082146 | A1* | 4/2012 | Andreasen et al. ........... 370/338 |
| 2012/0213103 | A1* | 8/2012 | Du et al. ....................... 370/252 |
| 2013/0039365 | A1* | 2/2013 | Kitada .......................... 370/392 |
| 2013/0156028 | A1* | 6/2013 | Hernandez et al. ........... 370/359 |
| 2013/0201979 | A1* | 8/2013 | Iyer et al. ...................... 370/338 |

FOREIGN PATENT DOCUMENTS

TW    1251998    3/2006

* cited by examiner

*Primary Examiner* — Asad Nawaz
*Assistant Examiner* — Syed S Ali
(74) *Attorney, Agent, or Firm* — Winston Hsu; Scott Margo

(57) ABSTRACT

A device for realizing upstream aggregation and downstream translation of a virtual local area network (VLAN) includes a buffer and a processor. The buffer is used for storing an ingress VLAN translation table and an egress VLAN translation table. The processor is used for translating an upstream packet inputted from a first user port into an upstream translation packet according to the ingress VLAN translation table, and transmitting the upstream translation packet to the Internet through an internet port, and translating a first downstream packet inputted from the internet port into a first downstream translation packet according to the egress VLAN translation table, and transmitting the first downstream translation packet to a user device through a second user port.

3 Claims, 6 Drawing Sheets

| Entry | User port | Original VLAN packet | Translated VLAN packet |
|---|---|---|---|
| 1 | 112 | 100 | 1000 |
| 2 | 112 | 200 | 1000 |
| 3 | 114 | 100 | 1000 |
| 4 | 114 | 200 | 2000 |

FIG. 2

| Entry | User port | Original VLAN packet | Translated VLAN packet |
|---|---|---|---|
| 1 | 112 | 1000 | 100 |
| 2 | 114 | 1000 | 200 |

FIG. 3

| User port | Source address | VLAN packet |
|---|---|---|
| 112 | 00-00-00-00-00-01 | 100 |
| 112 | 00-00-00-00-00-02 | 200 |
| 114 | 00-00-00-00-00-03 | 100 |
| 114 | 00-00-00-00-00-04 | 200 |

FIG. 4

DEVICE FOR REALIZING UPSTREAM AGGREGATION AND DOWNSTREAM TRANSLATION OF A VIRTUAL LOCAL AREA NETWORK AND METHOD THEREOF

BACKGROUND OF THE INVENTION

1. Field of the Invention

The present invention relates to a device for realizing upstream aggregation and downstream translation of a virtual local area network (VLAN) and a method thereof, and particularly to a device and a method thereof that can realize upstream aggregation and downstream translation of a VLAN according to an ingress VLAN translation table, an egress VLAN translation table, and a filtering database stored in a buffer.

2. Description of the Prior Art

"TR156: Using GPON Access in The Context of TR-101" and "CTC EPON Equipment Technical Requirement V3.0" define virtual local area network (VLAN) N:1 upstream aggregation (VLAN N:1). In addition, VLAN 1:N downstream translation (VLAN 1: N) is reverse mapping behavior of the VLAN N:1 upstream aggregation.

The "CTC EPON Equipment Technical Requirement V3.0" defines the VLAN N:1 upstream aggregation and the VLAN 1:N downstream translation as follows: the VLAN N:1 upstream aggregation is that a plurality of upstream packets (e.g. VLAN 1, 2, . . . , X) are aggregated to an upstream translation packet (e.g. VLAN Y), and the VLAN 1:N downstream translation is that a downstream packet (e.g. VLAN Y) is reversely mapped to a plurality of downstream translation packets (e.g. VLAN 1, 2, . . . , X).

The "CTC EPON Equipment Technical Requirement V3.0" describes the VLAN N:1 upstream aggregation as follows: in the N:1 VLAN upstream aggregation, an optical line terminal (OLT) or an optical network unit (ONU) can aggregate a plurality of upstream packets to an upstream translation packet (e.g. VLAN Y). The "CTC EPON Equipment Technical Requirement V3.0" describes the 1:N VLAN downstream translation as follows: a downstream packet (e.g. VLAN Y) inputted from an internet port can be reversely mapped to a plurality of downstream translation packets (e.g. VLAN 1, 2, . . . , X).

The N:1 VLAN upstream aggregation can be realized by an ingress VLAN translation table. The ingress VLAN translation table can set an upstream packet inputted from each user port to be translated into an upstream translation packet outputted through an internet port. Therefore, the ingress VLAN translation table can set a plurality of upstream packets (e.g. VLAN 1, 2, . . . , X) inputted from the same user port or different user ports to be translated into the same upstream translation packet (e.g. VLAN Y) to realize the N:1 VLAN upstream aggregation.

The 1:N VLAN downstream translation can be realized by an egress VLAN translation table. The egress VLAN translation table can set a downstream packet (e.g. VLAN Y) inputted from each internet port to be translated into a downstream translation packet (e.g. VLAN X) outputted through a user port. Therefore, the egress VLAN translation table can set a downstream packet to be translated into a downstream translation packet on different user ports. For examples, the egress VLAN translation table sets a downstream packet (e.g. VLAN Y) to be translated into a downstream translation packet (e.g. VLAN 1) on a first user port, and sets the downstream packet (e.g. VLAN Y) to be translated into another downstream translation packet (e.g. VLAN 2) on a second user port to realize the 1:N VLAN downstream translation.

The prior art can utilize the egress VLAN translation table to realize the 1:N VLAN downstream translation to translate a downstream packet into different downstream translation packets on different user ports, but only to translate a downstream packet into the same downstream translation packet on the same user port. For example, e.g. the prior art only translates the downstream packet (VLAN Y) into the downstream translation packet (VLAN 1) on the first user port. That is to say, the prior art can not translate a downstream packet (VLAN Y) into different downstream translation packets (e.g. VLAN 1 and VLAN 2) on the same user port (e.g. the first user port).

SUMMARY OF THE INVENTION

An embodiment provides a device for realizing upstream aggregation and downstream translation of a virtual local area network (VLAN). The device includes a buffer and a processor. The buffer is used for storing an ingress VLAN translation table and an egress VLAN translation table. The processor is used for translating an upstream packet inputted from a first user port into an upstream translation packet according to the ingress VLAN translation table, and transmitting the upstream translation packet to the Internet through an internet port, and translating a first downstream packet inputted from the internet port into a first downstream translation packet according to the egress VLAN translation table, and transmitting the first downstream translation packet to a user device through a second user port.

Another embodiment provides a method for realizing upstream aggregation of a VLAN. The method includes translating an upstream packet inputted from a user port into an upstream translation packet according to an ingress VLAN translation table; and transmitting the upstream translation packet to the Internet through an internet port.

Another embodiment provides a method for realizing downstream translation of a VLAN. The method includes translating a downstream packet inputted from an internet port into a downstream translation packet according to a downstream translation table; and transmitting the downstream translation packet to a user device through a user port.

The present invention provides a device for realizing upstream aggregation and downstream translation of a VLAN and a method thereof. The device and the method utilize a processor to translate an upstream packet inputted from a user port into an upstream translation packet, and translate a downstream packet inputted from an internet port into a downstream translation packet according to an ingress VLAN translation table, an egress VLAN translation table, and a filtering database stored in a buffer to realize the upstream aggregation and the downstream translation of the VLAN. Therefore, compared to the prior art, because the filtering database can learn and record information of a packet inputted from a user port, the present invention not only translates a downstream packet into different downstream translation packets on the same user port, but also translates a downstream packet into different downstream translation packets on different user ports.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the ingress VLAN translation table.

FIG. 3 is a diagram illustrating the egress VLAN translation table.

FIG. 4 is a diagram illustrating the filtering database.

DETAILED DESCRIPTION

Figure 1:
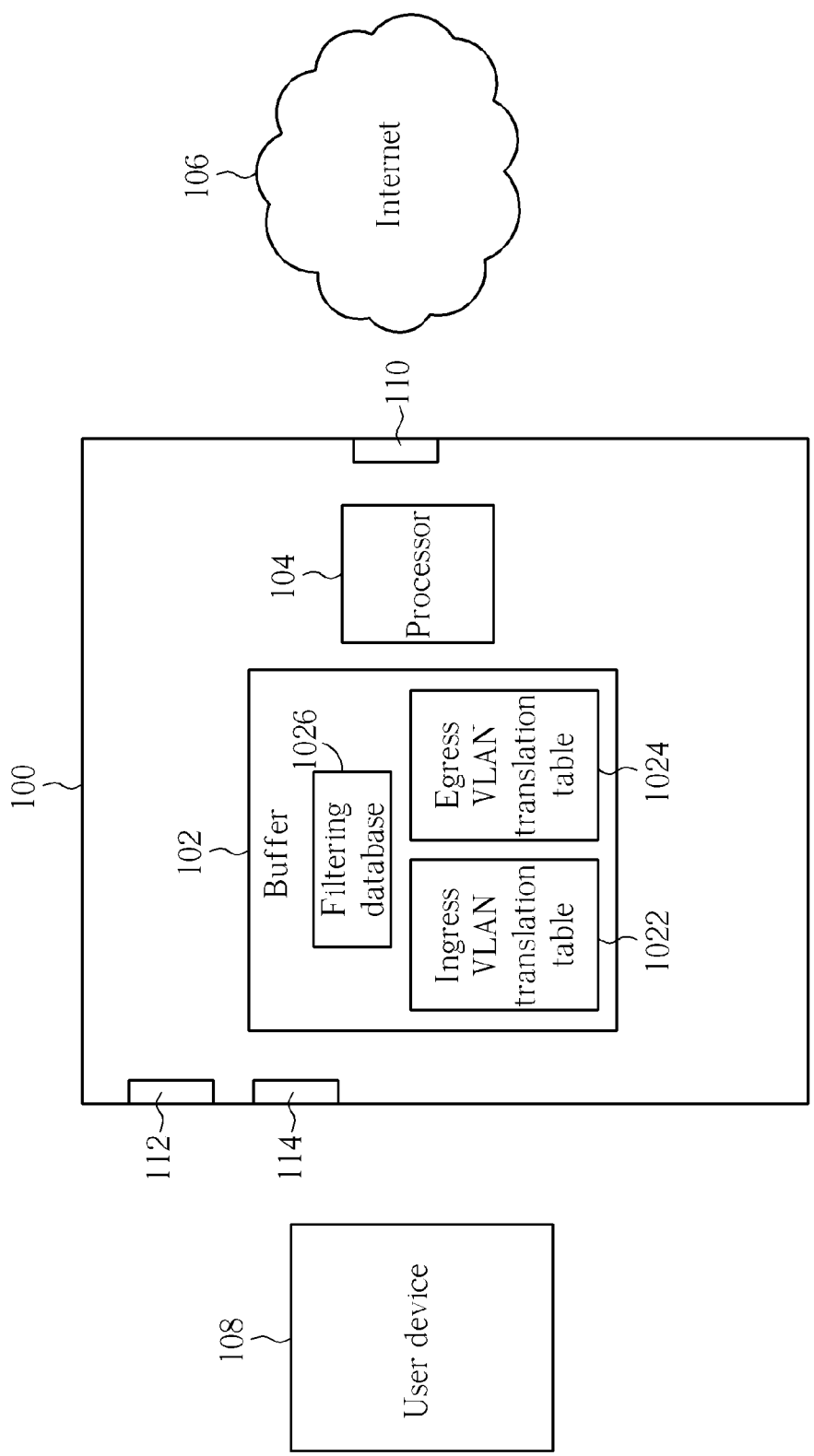
FIG. 1 is a diagram illustrating a device for realizing upstream aggregation and downstream translation of a virtual local area network according to an embodiment.

Please refer to FIG. 1. FIG. 1 is a diagram illustrating a device 100 for realizing upstream aggregation and downstream translation of a virtual local area network (VLAN) according to an embodiment. The device 100 includes a buffer 102 and a processor 104. The buffer 102 stores an ingress VLAN translation table 1022, an egress VLAN translation table 1024, and a filtering database 1026. The processor 104 can translate an upstream packet inputted from a first user port of the device 100 into an upstream translation packet according to the ingress VLAN translation table 1022, and transmit the upstream translation packet to the Internet 106 through an internet port 110 of the device 100. The ingress VLAN translation table 1022 includes corresponding relationships of the first user port, the upstream packet, and the upstream translation packet. In addition, the processor 104 can also translate a downstream packet inputted from the internet port 110 into a downstream translation packet according to the egress VLAN translation table 1024, and transmit the downstream translation packet to the user device 108 through a second user port. The egress VLAN translation table 1024 includes corresponding relationships of the second user port, the downstream packet, and the downstream translation packet.

Please refer to FIG. 2. FIG. 2 is a diagram illustrating the ingress VLAN translation table 1022. As shown in FIG. 2, the ingress VLAN translation table 1022 sets two ingress VLAN translation entries (e.g. a VLAN 100 packet is translated into a VLAN 1000 packet, and a VLAN 200 packet is translated into the VLAN 1000 packet) on a user port 112, and sets two ingress VLAN translation entries (e.g. a VLAN 100 packet is translated into the VLAN 1000 packet, and a VLAN 200 packet is translated into a VLAN 2000 packet) on a user port 114. Therefore, as shown in FIG. 1 and FIG. 2, the processor 104 can translate a VLAN 100 packet inputted from the user port 112 into a VLAN 1000 packet, a VLAN 200 packet inputted from the user port 112 into the VLAN 1000 packet, a VLAN 100 packet inputted from the user port 114 into the VLAN 1000 packet, and a VLAN 200 packet inputted from the user port 114 into the VLAN 2000 packet according to the ingress VLAN translation table 1022. Thus, the VLAN 100 packet and the VLAN 200 packet inputted from the user port 112, and the VLAN 100 packet inputted from the user port 114 are aggregated into the VLAN 1000 packet. However, the VLAN 200 packet inputted from the user port 114 is based on an independent translation instead of the upstream aggregation of the VLAN. Then, the processor 104 transmits the VLAN 1000 packet and the VLAN 2000 packet to the Internet 106 through the internet port 110. Thus, the device 100 can realize the upstream aggregation of the VLAN. In addition, the present invention is not limited to the ingress VLAN translation table 1022 shown in FIG. 2, the device 100 only including the two user ports 112 and 114, and the device 100 only including one internet port 110.

Please refer to FIG. 3. FIG. 3 is a diagram illustrating the egress VLAN translation table 1024. As shown in FIG. 3, the egress VLAN translation table 1024 sets an egress VLAN translation entry (e.g. a VLAN 1000 packet inputted from the internet port 110 is translated into a VLAN 100 packet) on the user port 112, and sets an egress VLAN translation entry (e.g. the VLAN 1000 packet inputted from the internet port 110 is translated into a VLAN 200 packet) on the user port 114. Therefore, as shown in FIG. 1 and FIG. 3, the processor 104 can translate a VLAN 1000 packet (outputted through the user port 112) inputted from the internet port 110 into a VLAN 100 packet, and the VLAN 1000 packet (outputted through the user port 114) inputted from the internet port 110 into a VLAN 200 packet according to the egress VLAN translation table 1024. Therefore, when a VLAN 1000 packet inputted from the internet port 110 is outputted through the user port 112, the VLAN 1000 packet inputted from the internet port 110 is translated into a VLAN 100 packet by the processor 104; and when the VLAN 1000 packet inputted from the internet port 110 is outputted through the user port 114, the VLAN 1000 packet inputted from the internet port 110 is translated into a VLAN 200 packet by the processor 104. Thus, the device 100 can realize the downstream translation of the VLAN. In addition, the present invention is not limited to the egress VLAN translation table 1024 shown in FIG. 3.

Please refer to FIG. 4. FIG. 4 is a diagram illustrating the filtering database 1026. The filtering database 1026 can learn and record information of a packet inputted from a user port of the device 100, where the information of the packet includes the user port inputting the packet, a source address corresponding to the packet, and a downstream translation packet corresponding to the packet. As shown in FIG. 4, if the device 100 receives a VLAN 100 packet including a source address 00-00-00-00-00-01 from the user port 112, a VLAN 200 packet including a source address 00-00-00-00-00-02 from the user port 112, a VLAN 100 packet including a source address 00-00-00-00-00-03 from the user port 114, and a VLAN 200 packet including a source address 00-00-00-00-00-04 from the user port 114, the filtering database 1026 can learn and record information of the VLAN 100 packet including the source address 00-00-00-00-00-01 and the VLAN 200 packet including the source address 00-00-00-00-00-02 inputted from the user port 112, and the VLAN 100 packet including the source address 00-00-00-00-00-03 and the VLAN 200 packet including the source address 00-00-00-00-00-04 inputted from the user port 114.

Therefore, when the device 100 receives a VLAN 1000 packet including a destination address 00-00-00-00-00-01 from the internet port 110, the processor 104 translates the VLAN 1000 packet including the destination address 00-00-00-00-00-01 into a VLAN 100 packet according to the filtering database 1026, and transmits the VLAN 100 packet through the user port 112; when the device 100 receives a VLAN 1000 packet including a destination address 00-00-00-00-00-02 from the internet port 110, the processor 104 translates the VLAN 1000 packet including the destination address 00-00-00-00-00-02 into a VLAN 200 packet according to the filtering database 1026, and transmits the VLAN 200 packet through the user port 112; when the device 100 receives a VLAN 1000 packet including a destination address 00-00-00-00-00-03 from the internet port 110, the processor 104 translates the VLAN 1000 packet including the destination address 00-00-00-00-00-03 into a VLAN 100 packet according to the filtering database 1026, and transmits the VLAN 100 packet through the user port 114; when the device 100 receives a VLAN 1000 packet including a destination address 00-00-00-00-00-04 from the internet port 110, the processor 104 translates the VLAN 1000 packet including the destination address 00-00-00-00-00-04 into a VLAN 200 packet according to the filtering database 1026, and transmits the VLAN 200 packet through the user port 114. Thus, when a VLAN 1000 packet inputted from the internet port 110 is outputted through the user port 112, the VLAN 1000 packet inputted from the internet port 110 can be translated into a VLAN 100 packet and a VLAN 200 packet according to destination addresses (00-00-00-00-00-01 and 00-00-00-00-00-02) by the processor 104, respectively; and when a VLAN 1000 packet inputted from the internet port 110 is outputted through the user port 114, the VLAN 1000 packet inputted from the internet port 110 can be translated into a VLAN 100 packet and a VLAN 200 packet according to destination addresses (00-00-00-00-00-03 and 00-00-00-00-00-04) by the processor 104, respectively. Thus, the device 100 can realize the downstream translation of the VLAN. In addition, the present invention is not limited to the filtering database 1026 shown in FIG. 4.

Figure 5:
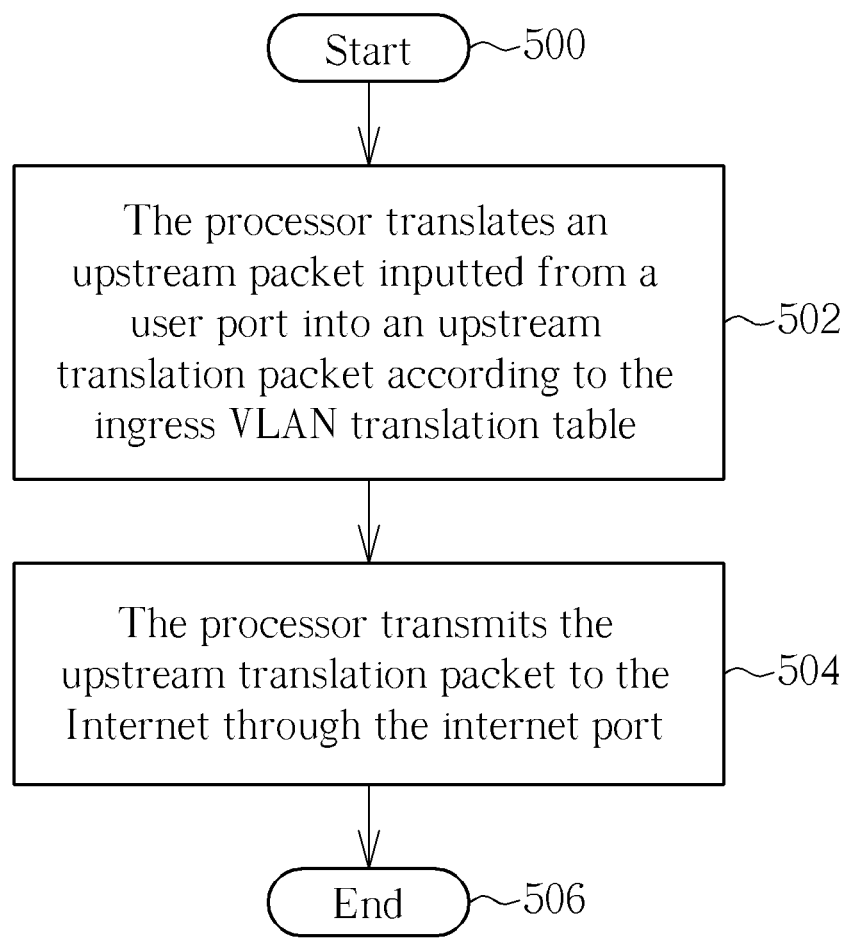
FIG. 5 is a flowchart illustrating method for realizing upstream aggregation of a virtual local area network according to another embodiment.

Please refer to FIG. 1, FIG. 2, and FIG. 5. FIG. 5 is a flowchart illustrating method for realizing upstream aggregation of a VLAN according to another embodiment. The method in FIG. 5 is illustrated using the device 100 in FIG. 1 and the ingress VLAN translation table 1022 in FIG. 2. Detailed steps are as follows:

Step 500: Start.

Step 502: The processor 104 translates an upstream packet inputted from a user port into an upstream translation packet according to the ingress VLAN translation table 1022.

Step 504: The processor 104 transmits the upstream translation packet to the Internet 106 through the internet port 110.

Step 506: End.

In Step 502, the ingress VLAN translation table 1022 includes corresponding relationships of the user port inputting the upstream packet, the upstream packet, and the upstream translation packet. Therefore, the processor 104 can translate the upstream packet inputted from the user port into the upstream translation packet according to the ingress VLAN translation table 1022. For example, the ingress VLAN translation table 1022 sets two ingress VLAN translation entries on the user port 112, that is, an upstream packet (a VLAN 100 packet) is translated into an upstream translation packet (a VLAN 1000 packet), and an upstream packet (a VLAN 200 packet) is translated into an upstream translation packet (a VLAN 1000 packet); and the ingress VLAN translation table 1022 sets two ingress VLAN translation entries on the user port 114, that is, an upstream packet (a VLAN 100 packet) is translated into an upstream translation packet (a VLAN 1000 packet), and an upstream packet (a VLAN 200 packet) is translated into an upstream translation packet (a VLAN 2000 packet). Therefore, as shown in FIG. 1 and FIG. 2, the processor 104 can translate the upstream packet (the VLAN 100 packet) inputted from the user port 112 into the upstream translation packet (the VLAN 1000 packet), the upstream packet (the VLAN 200 packet) inputted from the user port 112 into the upstream translation packet (the VLAN 1000 packet), the upstream packet (the VLAN 100 packet) inputted from the user port 114 into the upstream translation packet (the VLAN 1000 packet), and the upstream packet (the VLAN 200 packet) inputted from the user port 114 into the upstream translation packet (the VLAN 2000 packet) according to the ingress VLAN translation table 1022. Thus, the upstream packets (the VLAN 100 packet and the VLAN 200 packet) inputted from the user port 112, and the upstream packet (the VLAN 100 packet) inputted from the user port 114 are aggregated to the VLAN 1000 packet. However, the upstream packet (the VLAN 200 packet) inputted from the user port 114 is based on an independent translation instead of the upstream aggregation of the VLAN. In Step 504, the processor 104 can transmit the upstream translation packet (the VLAN 1000 packet) and the upstream translation packet (the VLAN 2000 packet) to the Internet 106 through the internet port 110.

Figure 6:
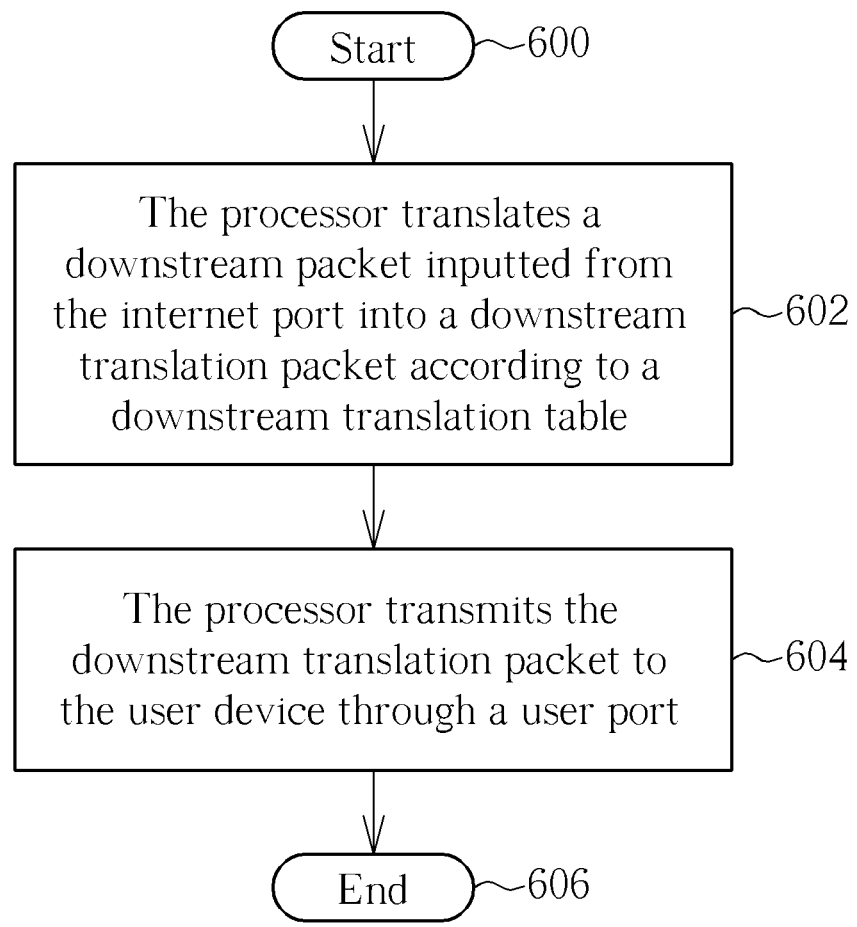
FIG. 6 is a flowchart illustrating method for realizing upstream aggregation of a virtual local area network according to another embodiment.

Please refer to FIG. 1, FIG. 3, FIG. 4, and FIG. 6. FIG. 6 is a flowchart illustrating method for realizing downstream translation of a VLAN according to another embodiment. The method in FIG. 6 is illustrated using the device 100 in FIG. 1, the egress VLAN translation table 1024 in FIG. 3, and the filtering database 1026 in FIG. 4. Detailed steps are as follows:

Step 600: Start.

Step 602: The processor 104 translates a downstream packet inputted from the internet port 110 into a downstream translation packet according to a downstream translation table.

Step 604: The processor 104 transmits the downstream translation packet to the user device 108 through a user port.

Step 606: End.

Please refer to FIG. 1 and FIG. 3. In Step 602 and Step 604, the downstream translation table is the egress VLAN translation table 1024, where the egress VLAN translation table 1024 includes corresponding relationships of the user port outputting the downstream translation packet, the downstream packet, and the downstream translation packet. Therefore, the processor 104 can translate the downstream packet inputted from the internet port 110 into the downstream translation packet according to the egress VLAN translation table 1024. For example, the egress VLAN translation table 1024 sets an egress VLAN translation entry on the user port 112, that is, a downstream packet (a VLAN 1000 packet) inputted from the internet port 110 is translated into a downstream translation packet (a VLAN 100 packet) outputted through the user port 112; and the egress VLAN translation table 1024 sets an egress VLAN translation entry on the user port 114, that is, a downstream packet (a VLAN 1000 packet) inputted from the internet port 110 is translated into a downstream translation packet (a VLAN 200 packet) outputted through the user port 114. Therefore, as shown in FIG. 1 and FIG. 3, the processor 104 can translate the downstream packet (the VLAN 1000 packet outputted through the user port 112) inputted from the internet port 110 into the downstream translation packet (the VLAN 100 packet), and translate the downstream packet (the VLAN 1000 packet outputted through the user port 114) inputted from the internet port 110 into the downstream translation packet (the VLAN 200 packet) according to the egress VLAN translation table 1024. Therefore, when the downstream packet (the VLAN 1000 packet) inputted from the internet port 110 is outputted through the user port 112 to the user device 108, the VLAN 1000 packet inputted from the internet port 110 is translated into the downstream translation packet (the VLAN 100 packet) by the processor 104; and when the VLAN 1000 packet inputted from the internet port 110 is outputted through the user port 114 to the user device 108, the VLAN 1000 packet inputted from the internet port 110 is translated into the downstream translation packet (the VLAN 200 packet) by the processor 104.

Please refer to FIG. 1 and FIG. 4. In Step 602 and Step 604, the downstream translation table is the filtering database 1026, where the filtering database 1026 can learn and record information of a packet inputted from a user port of the device 100, and the information of the packet includes the user port inputting the packet, a source address corresponding to the packet, and a downstream translation packet corresponding to the packet. As shown in FIG. 4, if the device 100 receives a VLAN 100 packet including a source address 00-00-00-00-00-01 from the user port 112, a VLAN 200 packet including a source address 00-00-00-00-00-02 from the user port 112, a VLAN 100 packet including a source address 00-00-00-00-00-03 from the user port 114, and a VLAN 200 packet including a source address 00-00-00-00-00-04 from the user port 114, the filtering database 1026 can learn and record information of the VLAN 100 packet including the source address 00-00-00-00-00-01 and the VLAN 200 packet including the source address 00-00-00-00-00-02 inputted from the user port 112, and the VLAN 100 packet including the source address 00-00-00-00-00-03 and the VLAN 200 packet including the source address 00-00-00-00-00-04 inputted from the user port 114.

Therefore, when the device 100 receives a downstream packet (a VLAN 1000 packet) including a destination address 00-00-00-00-00-01 from the internet port 110, the processor 104 translates the downstream packet (the VLAN 1000 packet) including the destination address 00-00-00-00-00-01 into a downstream translation packet (a VLAN 100 packet) according to the filtering database 1026, and transmits the downstream translation packet (the VLAN 100 packet) to the user device 108 through the user port 112; when the device 100 receives a downstream packet (a VLAN 1000 packet) including a destination address 00-00-00-00-00-02 from the internet port 110, the processor 104 translates the downstream packet (the VLAN 1000 packet) including the destination address 00-00-00-00-00-02 into a downstream translation packet (a VLAN 200 packet) according to the filtering database 1026, and transmits the downstream translation packet (the VLAN 200 packet) to the user device 108 through the user port 112; when the device 100 receives a downstream packet (a VLAN 1000 packet) including a destination address 00-00-00-00-00-03 from the internet port 110, the processor 104 translates the downstream packet (the VLAN 1000 packet) including the destination address 00-00-00-00-00-03 into a downstream translation packet (a VLAN 100 packet) according to the filtering database 1026, and transmits the downstream translation packet (the VLAN 100 packet) to the user device 108 through the user port 114; when the device 100 receives a downstream packet (a VLAN 1000 packet) including a destination address 00-00-00-00-00-04 from the internet port 110, the processor 104 translates the downstream packet (the VLAN 1000 packet) including the destination address 00-00-00-00-00-04 into a downstream translation packet (a VLAN 200 packet) according to the filtering database 1026, and transmits the downstream translation packet (the VLAN 200 packet) to the user device 108 through the user port 114. Thus, when the downstream packet (the VLAN 1000 packet) inputted from the internet port 110 is outputted through the user port 112, the downstream. packet (the VLAN 1000 packet) inputted from the internet port 110 can be translated into the VLAN 100 packet and the VLAN 200 packet by the processor 104 according to the destination addresses (00-00-00-00-00-01 and 00-00-00-00-00-02), respectively; and when the downstream packet (the VLAN 1000 packet) inputted from the internet port 110 is outputted through the user port 114, the downstream packet (the VLAN 1000 packet) inputted from the internet port 110 can be translated into the VLAN 100 packet and the VLAN 200 packet by the processor 104 according to the destination addresses (00-00-00-00-00-03 and 00-00-00-00-00-04), respectively. Thus, the device 100 can realize the downstream translation of the VLAN.

To sum up, the device for realizing the upstream aggregation and the downstream translation of the VLAN and the method thereof utilize the processor to translate an upstream packet inputted from a user port into an upstream translation packet, and translate a downstream packet inputted from an internet port into a downstream translation packet according to the ingress VLAN translation table, the egress VLAN translation table, and the filtering database stored in the buffer to realize the upstream aggregation and the downstream translation of the VLAN. Therefore, compared to the prior art, because the filtering database can learn and record information of a packet inputted from a user port, the present invention not only translates a downstream packet into different downstream translation packets on the same user port, but also translates a downstream packet into different downstream translation packets on different user ports.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for realizing upstream aggregation and downstream translation of a virtual local area network (VLAN), the device comprising:
    a buffer for storing an ingress VLAN translation table and an egress VLAN translation table; and
    a processor for translating an upstream packet inputted from a first user port into an upstream translation packet according to the ingress VLAN translation table, and transmitting the upstream translation packet to the Internet through an internet port, and translating a first downstream packet inputted from the internet port into at least one different first downstream translation packet according to the egress VLAN translation table, and transmitting the at least one different first downstream translation packet to a user device through a same user port, wherein the egress VLAN translation table comprises corresponding relationships of the same user port, the first downstream packet, and the at least one different first downstream translation packet;
    wherein the buffer further comprises a filtering database for learning and recording information of a packet inputted from a second user port, the packet inputted from the second user port being based on an independent translation instead of the upstream aggregation of the VLAN, wherein the processor translates a second downstream packet inputted from the internet port into a second downstream translation packet according to the information of the packet, and the information of the packet comprises the second user port, a source address corresponding to the packet, and the second downstream translation packet.

2. The device of claim 1, wherein the ingress VLAN translation table comprises corresponding relationships of the first user port, the upstream packet, and the upstream translation packet.

3. A method for realizing downstream translation of a VLAN, the method comprising:
    translating a downstream packet inputted from an internet port into at least one different downstream translation packet according to an egress VLAN translation table;
    transmitting the at least one different downstream translation packet to a user device through a same user port, wherein the egress VLAN translation table comprises corresponding relationships of the same user port, the downstream packet, and the at least one different downstream translation packet; and learning and recording information of a packet inputted from an other user port, the packet inputted from the other user port being based on an independent translation instead of upstream aggregation of the VLAN, wherein an other downstream packet inputted from the internet port is translated into an other downstream translation packet according to the information of the packet, and the information of the packet comprises the other user port, a source address corresponding to the packet, and the other downstream translation packet.

* * * * *